3,181,691
AUTOMATIC CHAIN TENSIONING DEVICE
William Herbert Kagley, Dinuba, Calif., assignor to Lindsay Ripe Olive Company, Lindsay, Calif., a corporation of California
Filed Feb. 3, 1964, Ser. No. 342,138
6 Claims. (Cl. 198—208)

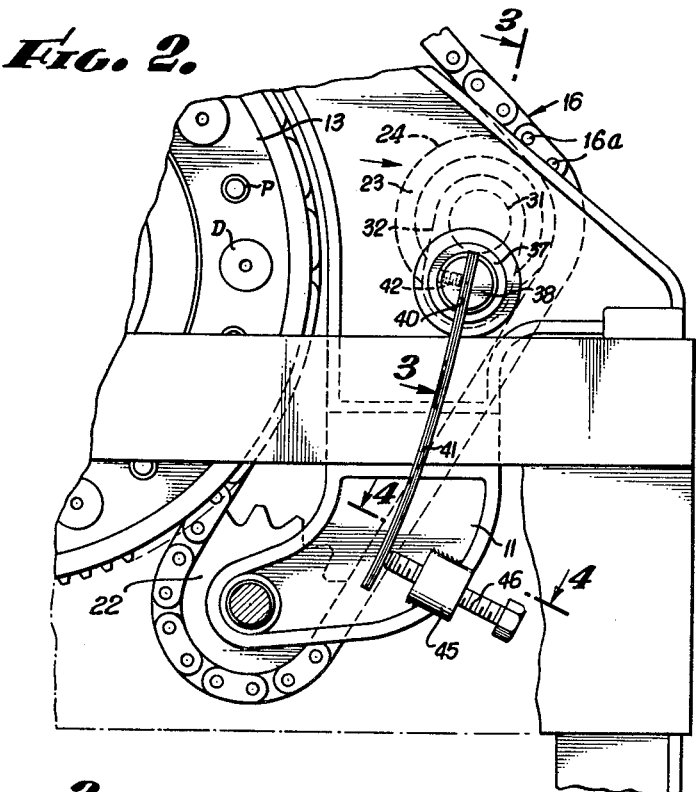
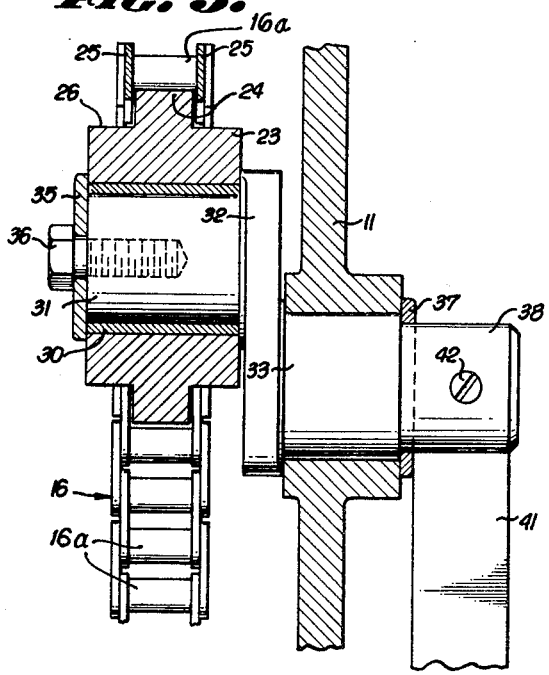
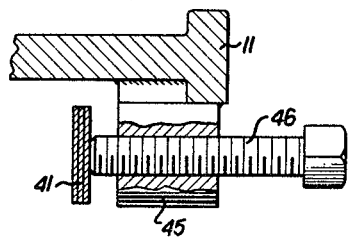
FIG. 2.
FIG. 3.
FIG. 4.
INVENTOR.
WILLIAM HERBERT KAGLEY
BY
Huebner & Worrel
ATTORNEYS.

This invention relates to an automatic chain tensioning device for incorporation in machinery wherein an endless chain travels over a plurality of spaced apart sprockets or other rotary elements and wherein the correct tensioning of the chain is an important factor in the operation of the machine. The application is a continuation-in-part of my copending application Serial No. 201,198, filed June 8, 1962, now abandoned.

Chain tensioning devices such as sprockets or rollers the axles or bushings of which are adjustably mounted to position a reach of the chain and to maintain the chain generally tight by suitable adjustment from time to time have been known, for example, in fruit pitting machines, see U.S. Patent No. 2,341,857, granted February 15, 1944, on an application of Drake, Alberty and Kagley (the Kagley being the applicant in the current case) wherein element 161, well shown in FIGURE 10, is a sprocket which is shown as an idler and which is adjustable by means of an eccentric mechanism illustrated. A similar adjustable idler sprocket is shown in U.S. Patent No. 2,821,227, granted January 28, 1958, on an application of Kagley and Milam (the same Kagley as herein), the sprocket not being identified by any reference numeral but being clearly observed at the right hand side of FIGURE 1 where the chain makes its outer turn.

These idler sprockets and the eccentric adjustments associated therewith have provided a rigid tensioning and positioning of the chain. Some difficulty has been encountered due to that fact inasmuch as in an olive pitting machine of the character disclosed in the two U.S. patents referred to the accurate linear positioning during travel of the endless chain over its several associated elements is particularly essential. Chains are generally but somewhat erroneously regarded as having a fixed length, but as a chain wears, the pitch length may differ at various places along the chain due to uneven wearing of the parts thereof, and there may also be a variation in sprocket concentricity due to irregular wearing of the sprockets over which the chain travels.

It is a basic object of the present invention to provide an automatic chain tensioning device which will compensate for variation in chain pitch length and sprocket concentricity. It is calculated to eliminate or materially reduce the problem encountered with a rigid adjustment wherein the chain may be tight over some lengths and loose over others. By the present invention the chain is suitably tensioned after it leaves the drive sprocket and before it engages a driven sprocket which defines one terminal of its functional path.

A more specific object of the invention is to provide a resilient and adjustable automatic chain tensioning device embodying a tensioning idler roller resiliently urged by a leaf spring in tensioning direction.

A further object is to provide such a tensioning device in a position to take up slack in the chain after it leaves a drive sprocket and before it engages a driven sprocket which defines one terminal of its functional path, the other terminal of which is the drive sprocket, and the functional path includes travel over a drum where uniformity of link spacing is important.

These and additional objects and advantages of the invention will become apparent from a consideration of the description which follows taken in conjunction with the drawings.

In the drawings:
FIGURE 1 is a side elevation partly in section of the central portion of an olive pitting machine such as is shown in U.S. Patent Nos. 2,341,857 and 2,821,227, and which machine incorporates the automatic chain tensioning device.

FIGURE 2 is an enlarged fragmentary elevation of the right hand region illustrated in FIGURE 1 but taken on a vertical plane closer to the viewer. In the machine presently illustrated there are twin sets of chains and tensioning devices. The chains and tensioning devices shown in FIGURE 1 are farthest from the viewer and the same parts shown in FIGURE 2 are those nearest to the viewer.

FIGURE 3 is an enlarged vertical section taken on line 3—3 of FIGURE 2.

FIGURE 4 is an enlarged fragmentary section taken on line 4—4 of FIGURE 2.

Figure 1:
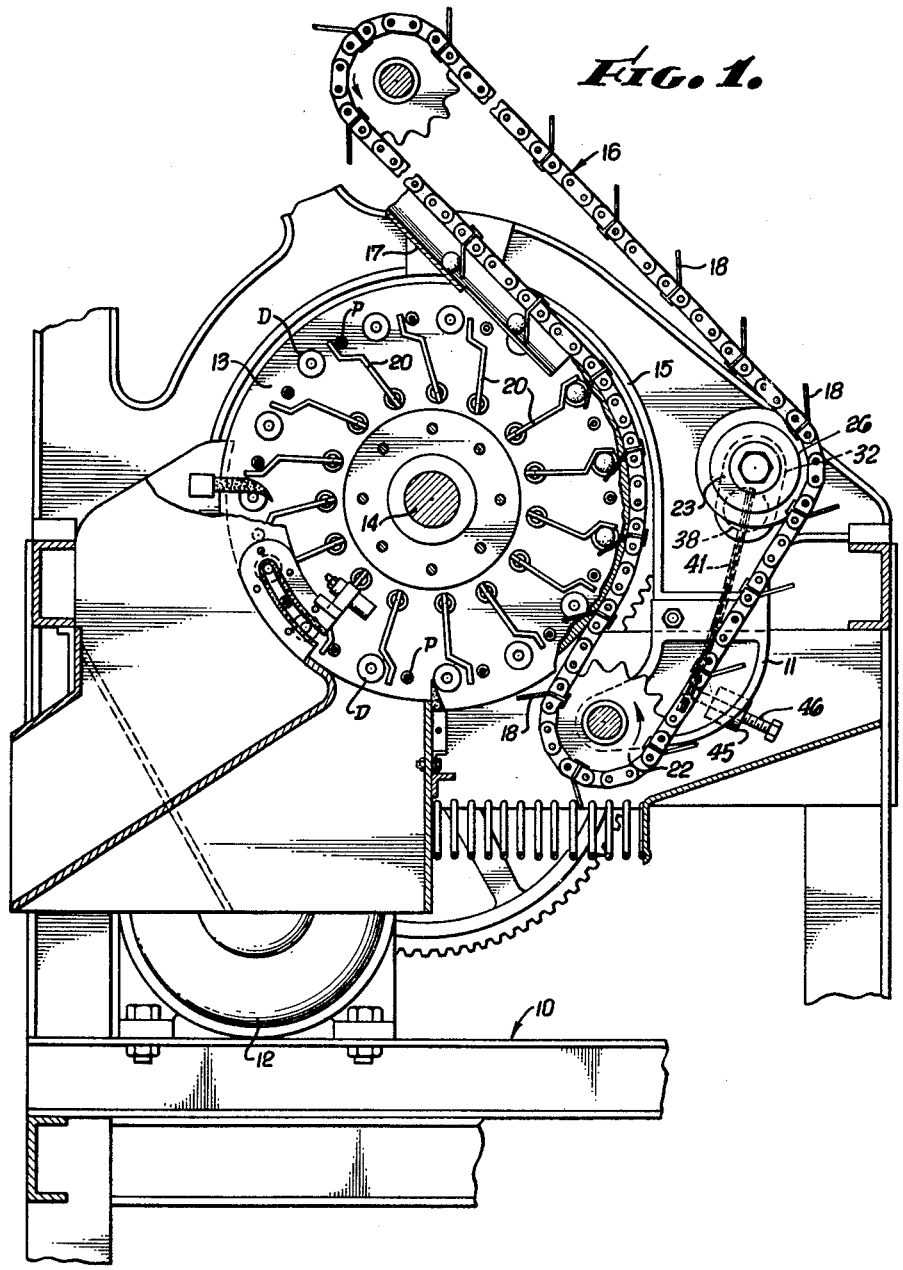

It is not deemed essential in the present application to illustrate a complete olive pitting machine or any other complete apparatus wherein my automatic chain tensioning device is applicable due to the fact that reference to various patents, including two patents specifically identified, will establish the mechanism constituting the overall environment.

Referring specifically to FIGURE 1, the machine is supported on a main frame structure 10 which includes a frame subdivision 11, later more expressly referred to. A prime mover, such as an electric motor 12, is carried on the frame and through suitable gearing drives drums 13 rotationally mounted on a fixed shaft 14. Each drum includes an annular sprocket ring 15. This annular sprocket ring 15 engages an endless chain 16 which has a course of travel to be briefly described as follows: From an upper idler or driven sprocket S the chain travels obliquely down in proximity to an olive aligning chute 17. The chain carries a plurality of spaced apart spacer fingers 18 which in the present machine function to each hold an olive as it rolls down the aligning chute 17 in position to be approached by one of a plurality of gripper fingers 20 carried on the drum 13. The chain and the drum travel in synchronism due to the engagement of the chain with the drum, and the gripper fingers are actuated by cam mechanism (not shown) to likewise synchronize in their movements for the olive gripping action by which an olive is gripped between a spacer finger and the gripper finger for presentation before one of a plurality of aligned dies D and punches P for a pitting operation to take place.

After completing the necessary travel over the drum the chain leads to a drive sprocket 22, and thence moves obliquely upward and outward over a tensioning roller 23 and from thence to its point of origin. The chain could be driven by its engagement with the rotating drum 13 or by its engagement with the sprocket 22, or both. In the present illustration the sprocket 22 is the drive, which sprocket in turn is driven by suitable gearing from the electric motor 12.

Turning now to the crux of the present invention, the automatic tensioning device includes the roller 23, heretofore referred to. It may be formed of stainless steel, nylon, or any other suitable preferably non-yielding material, and includes a central peripheral flange 24 adapted to engage chain link sleeves 16a and also function as a track for guiding opposed chain link plates 25 during travel of the chain over the roller. There are no sprocket teeth provided on this roller 23, as shown, it being of unbroken annular configuration. However, an idler sprocket would also perform the required function.

The roller 23 is provided with a bushing 30 adapted to freely revolve over a pin 31. The pin 31 is mounted on a crank arm 32 which carries a pin 33 extending from the crank arm in a direction opposite that to the extending position of the pin 31. The roller may be retained on the pin 31 by a thrust collar 35 held by a machine screw 36 threaded into the pin 31.

The pin 33 is rotatably journaled in the frame section 11 previously identified, being retained against axial displacement in one direction by a thrust collar 37.

The pin 33 is formed with a reduced extension 38 which extends through the thrust collar 37. The reduced section 38 is provided with a diametrical slot 40 for the reception of a flat leaf spring 41. The spring is retained in the slot by a set screw 42.

This spring is preferably of a multileaf elongated form, of beryllium copper, although it may be composed of any suitably resilient but relatively stiff material either in a single flat piece or in a multilayer assembly, having the capacity to hold the chain in tension notwithstanding variations in the length of the chain at any instant between the two sprockets between which the tensioning mechanism is positioned.

A fine adjustment is provided for setting the spring at the desired tension, in the form of a boss 45 extending from a portion of the frame section 11 near the lower end of the spring. The boss is suitably tapped and threaded, and an adjusting screw 46 is threaded through the boss and into engagement with the spring 41 near the lower end thereof.

In operation, the spring 41 urges the pin or rocker shaft 33 in a clockwise direction as shown in FIGURES 1 and 2. This force tends to rotate the crank arm 32 also in a clockwise direction, which rocks the pin or crank shaft 31 toward the right as viewed in FIGURES 1 and 2 for the purpose of resiliently holding the tensioning roller 23 in engagement with the chain 16. The desired amount of tension is obtained by adjusting the set screw 46 to increase or decrease the biasing effect of the spring. When the tension of the spring is properly set the roller will remain in engagement with the chain while the chain continues its endless travel; the chain will thus be sustained in a taut condition, and should some areas of the chain be longer or shorter than other areas due to a variation in pitch length or should the effect of the chain length vary owing to variation in sprocket concentricity, the tensioning of the chain will nevertheless be maintained due to the flexible resiliency of the spring 41 which will yield under sufficient force exerted by a shortening of the effective length of a section of the chain but will urge the tensioning roller outwardly when the length of the chain increases so that in general operation the chain will at all times remain under generally even tension.

While I have herein shown and described my invention in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

What I claim is:

1. In an article handling machine comprising a frame, a rotatable drum mounted on the frame and embodying article contacting elements, an endless chain embodying fingers projecting outwardly therefrom and the outside of said chain traversing a peripheral arc of said drum whereby the fingers and contacting elements are successively brought into cooperative juxtaposition, rotary members oppositely spaced from said drum along extensions of a cord across the drum, the inside of the chain traversing said rotary members and being thereby confined to the path of the arc of the drum, and another rotary element mounted on said frame externally of the peripheral arc of the drum and on a radial line passing through said cord, the inside of the chain traversing said last named rotary element and the latter providing a spacer stretching the chain and maintaining generally opposed reaches of the chain separated, the mounting for the last named rotary element providing for lateral shifting of said element toward and from the axis of the drum, and resilient means of predetermined tension biasing said element in a direction away from said drum, said resilient means being constantly responsive to variations in pitch length of the chain enabling the rotary element to shift as necessary to maintain substantially a uniform tension in the chain as it travels over the drum.

2. The combination as defined in claim 1 in which the mounting for the last named rotary element comprises a crank having a main shaft journaled in a portion of the frame, a crank arm extending normal to the axis of the main shaft and disposed on one side of the frame portion, a roller mounting pin extending from the crank arm with an axis parallel to that of the main shaft, and a main shaft extension projecting outwardly from the opposite side of the frame portion and to which said resilient means is secured, said last named rotary element comprising a roller on said mounting pin.

3. The combination as defined in claim 2 in which the resilient means is an elongated flat leaf spring the general plane of which is substantially normal to the lateral arcuate path through which the rotary element shifts.

4. The combination as defined in claim 3 wherein the leaf spring is secured at one end to said main shaft extension, abutment means on the frame comprising a threaded boss and a cap screw threaded through the boss and adjustable therein, the other end of said spring pressurably abutting against said cap screw.

5. The combination as defined in claim 1 in which the endless chain includes side plates and transverse couplers therebetween, and the last named rotary element comprises a roller provided with a central peripheral flange operating as a guide between the side plates of the chain and the peripheral surface of the flange bears directly against the transverse couplers of the chain.

6. In an article handling machine comprising a frame, a rotatable drum mounted on the frame and embodying article contacting elements, an endless chain with side plates and transverse couplers therebetween, said endless chain embodying fingers projecting outwardly therefrom and the outside of said chain traversing a peripheral arc of said drum whereby the fingers and contacting elements are successively brought into cooperative juxtaposition, rotary members oppositely spaced from said drum along extensions of a cord across the drum, the inside of the chain traversing said rotary members and being thereby confined to the arc of the drum, and a roller provided with a central peripheral flange mounted on said frame externally of the peripheral arc of the drum and on a radial line passing through said cord, the inside of the chain traversing said roller with the central peripheral flange thereof acting as a guide between the side plates of the chain and with the peripheral surface of the flange bearing directly against the transverse couplers of the chain, said roller providing a spacer stretching the chain and maintaining generally opposed reaches of the chain separated, a mounting for the roller providing for lateral shifting of said element toward and from the axis of the drum, said mounting comprising a crank having a main shaft journaled in a portion of the frame, a crank arm extending normal to the axis of the main shaft and disposed on one side of the frame portion, a roller mounting pin extending from the crank arm with an axis parallel to that of the main shaft, and a main shaft extension projecting outwardly from the opposite side of the frame portion and a resilient leaf spring secured to the main shaft extension so as to provide a predetermined tension biasing for said roller in a direction away from said drum, said resilient leaf spring being constantly responsive to variations in pitch length of the chain enabling the roller to shift as necessary to maintain substantially a uniform tension in the chain as it travels over the drum.

References Cited by the Examiner

UNITED STATES PATENTS

| 981,894 | 1/11 | Spinney | 198—208 |
| 2,341,857 | 2/44 | Drake et al. | 146—27 |
| 2,821,227 | 1/58 | Kagley | 146—27 |

SAMUEL F. COLEMAN, *Primary Examiner.*

WILLIAM B. LA BORDE, *Examiner.*